(12) United States Patent
Piotrowski

(10) Patent No.: US 7,823,916 B2
(45) Date of Patent: Nov. 2, 2010

(54) DRIVER-SIDE SUPPLEMENTAL INFLATABLE RESTRAINT SYSTEM WITH SECONDARY INFLATABLE RESTRAINT

(75) Inventor: Jason A. Piotrowski, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 218 days.

(21) Appl. No.: 12/145,649

(22) Filed: Jun. 25, 2008

(65) Prior Publication Data

US 2009/0322064 A1 Dec. 31, 2009

(51) Int. Cl.
*B60R 21/16* (2006.01)
(52) U.S. Cl. ...................................................... 280/731
(58) Field of Classification Search .................. 280/731, 280/730.1
See application file for complete search history.

(56) References Cited

U.S. PATENT DOCUMENTS 6,382,661 B1 * 5/2002 Sutherland ............... 280/728.2
7,441,799 B2 * 10/2008 Enders et al. ............... 280/731
7,581,614 B2 * 9/2009 Yatagai et al. .............. 180/274
7,602,278 B2 * 10/2009 Prost-Fin et al. ............ 340/438
7,605,694 B2 * 10/2009 Prost-Fin et al. ............ 340/438
7,631,891 B2 * 12/2009 Washino ..................... 280/731

* cited by examiner

*Primary Examiner*—Faye M. Fleming
(74) *Attorney, Agent, or Firm*—Quinn Law Group, PLLC

(57) ABSTRACT

A driver-side supplemental inflatable restraint system is provided. The restraint system includes a steering wheel assembly configured to attach inside of a vehicle passenger compartment, proximate to the driver's seat. The steering wheel assembly includes an annular wheel rim attached to a wheel hub. The wheel rim and hub each define a cavity with an opening. A primary inflatable cushion is operable to transition through the hub opening from a non-expanded state, stowed inside the hub cavity, to an expanded state, inflated outside the hub cavity. A secondary inflatable cushion is operable to transition through the rim opening from a non-expanded state, stowed inside the rim cavity, to an expanded state, inflated outside the rim cavity. At least one inflator is in fluid communication with the primary and secondary cushions, and operable to selectively dispense inflation fluid thereto, and thereby transition the cushions from respective non-expanded states to expanded states.

20 Claims, 1 Drawing Sheet

DRIVER-SIDE SUPPLEMENTAL INFLATABLE RESTRAINT SYSTEM WITH SECONDARY INFLATABLE RESTRAINT

TECHNICAL FIELD

The present invention relates generally to occupant restraint devices for motorized vehicles. More particularly, the present invention relates to secondary inflatable restraints for driver-side supplemental inflatable restraint systems.

BACKGROUND OF THE INVENTION

Inflatable airbag devices, which are more commonly referred to in the art as Supplementary Restraint Systems (SRS), Air Cushion Restraint Systems (ACRS), or Supplemental Inflatable Restraint (SIR) Systems, are originally equipped in almost all present day automotive vehicles. Included as part of an overall occupant restraint system, airbag devices are generally located in the vehicle passenger compartment, and act as a selectively deployable cushion capable of attenuating occupant kinetic energy. Moreover, airbags are designed to minimize inadvertent movement of the driver and/or other occupants to help avoid involuntary contact with interior portions of the automobile.

Traditional airbag devices comprise an inflatable airbag module stored behind the vehicle instrument panel (e.g., for passenger-side airbags), mounted to the steering wheel (e.g., for driver-side airbags), or packaged under the trim lining along the vehicle roof rail (e.g., side curtain airbags). A plurality of sensors or similar devices is strategically located throughout the vehicle to detect the onset of a predetermined activation event (e.g., a sudden deceleration spike). The sensors responsively activate an inflation device, such as a solid propellant canister, that is internally located in the airbag module, to produce a flow of inflating gas into an inflatable flexible membrane (i.e., an airbag cushion), which is normally folded inside of the airbag module. This causes the airbag cushion to deploy within the vehicle passenger compartment.

Most driver-side air bag devices are housed inside of a module which is mechanically attached to the center hub of the vehicle steering wheel assembly, for example, by rivets or threaded fasteners. Modular airbag devices with snap-in steering wheel interfaces are also employed to reduce assembly costs. A functional and decorative cover encloses the air bag. The cover is normally manufactured with a tear seam which the air bag cushion ruptures during inflation to enable the air bag to deploy. The air bag module normally utilizes numerous fasteners and stampings to assemble the component parts together into the module, and to mount the module to the steering wheel assembly.

SUMMARY OF THE INVENTION

According to one embodiment of the present invention, a supplemental inflatable restraint system is provided for a vehicle having a passenger compartment with a seat assembly mounted therein. The restraint system of this embodiment includes a steering wheel assembly that is configured to attach to the vehicle inside of the passenger compartment, adjacent to the seat assembly. The steering wheel assembly includes a wheel rim that defines a cavity with an opening. A first inflatable cushion (or "secondary restraint") is operable to transition through the rim opening from a non-expanded state, in which the cushion is substantially inside the rim cavity, to an expanded state, in which the cushion is substantially outside the rim cavity. At least one fluid dispensing apparatus is in fluid communication with the first inflatable cushion, and operable to selectively dispense inflation fluid thereto and thereby transition the first inflatable cushion from the non-expanded state to the expanded state.

According to one aspect of this embodiment, the steering wheel assembly also includes a wheel hub that is attached to the wheel rim (e.g., via spokes), and defines a cavity with an opening. In this instance, the restraint system includes a second inflatable cushion (or "primary restraint") that is in fluid communication with the fluid dispensing apparatus. This inflatable cushion is operable to transition through the hub opening from a non-expanded state, in which the second inflatable cushion is substantially inside the hub cavity, to an expanded state, in which the second inflatable cushion is substantially outside the hub cavity.

In accordance with another aspect of this embodiment, the first inflatable cushion (i.e., secondary restraint) has an inflated volume that is smaller than the inflated volume of the second inflatable cushion (i.e., primary restraint). In a similar respect, it is also desired that the first inflatable cushion have an inflation pressure that is greater than the inflation pressure of the second inflatable cushion. Finally, the density of the first inflatable cushion is preferably greater than the density of the second inflatable cushion.

According to yet another aspect, the at least one fluid dispensing apparatus consists of two separate inflators: a first inflator that is in fluid communication with the first inflatable cushion (i.e., secondary restraint), and a second inflator that is in fluid communication with the second inflatable cushion (i.e., primary restraint).

In yet another aspect of this embodiment, a controller is in operative communication with the fluid dispensing apparatus (e.g., electrically connected to the first and second inflators). The controller is operable to regulate the selective transition of the first and second inflatable cushions from their respective non-expanded states to expanded states. The controller is programmed and configured to transition the inflatable cushions to their respective expanded states in response to a predetermined activation event. All though not required to practice the present invention, it is desirable that the first inflatable cushion be transitioned prior to the second inflatable cushion.

In accordance with yet another aspect, the first inflatable cushion (i.e., secondary restraint) extends in a continuous manner around the circumference of the wheel hub. Alternatively, the first inflatable cushion can be designed to inflate from only preselected locations of the wheel rim. It is also preferred that the first inflatable cushion not include any venting features designed to exhaust inflation gas therefrom.

According to another aspect of this embodiment, the wheel rim includes an annular substrate with an exterior trim layer attached thereto. In this instance, the wheel rim includes a tear seam that is configured to weaken the trim layer at preselected locations such that the first inflatable cushion can selectively deploy therethrough when transitioning from the non-expanded state to the expanded state.

In another embodiment of the present invention, a driver-side supplemental inflatable restraint system is provided for a motorized vehicle having a passenger compartment with a driver's seat operatively mounted at a forward end therein. The restraint system of this embodiment includes a steering wheel assembly that is configured to operatively mount to the vehicle, inside of the passenger compartment, forward of and proximate to the driver's seat. The steering wheel assembly includes an annular wheel rim that is attached to, and at least partially circumscribes a wheel hub. The wheel hub defines a primary cavity therein with a primary opening that at least partially faces the driver's seat. In a similar regard, the wheel rim defines a secondary cavity therein with a secondary opening that at least partially faces the driver's seat.

The restraint system also includes a primary inflatable cushion that is operable to transition through the primary opening in the wheel hub from a non-expanded state, in which the primary cushion is stowed inside the primary cavity, to an expanded state, in which the primary cushion is inflated substantially outside the primary cavity. A secondary inflatable cushion is operable to transition through the secondary opening in the wheel rim from a non-expanded state, in which the secondary cushion is stowed inside the secondary cavity, to an expanded state, in which the secondary cushion is inflated substantially outside the secondary cavity. One or more fluid dispensing apparatuses are in fluid communication with the primary and secondary inflatable cushions, and operable to selectively dispense inflation fluid thereto and thereby transition the inflatable cushions from their respective non-expanded states to expanded states.

In accordance with another embodiment of the present invention, a motorized vehicle is provided. The motorized vehicle includes one or more seat assemblies that are mounted inside of the vehicle passenger compartment, including a driver's seat operatively mounted at a forward end of the passenger compartment. A steering wheel assembly is mounted to the vehicle, inside of the passenger compartment, forward of and proximate to the driver's seat. The steering wheel assembly includes an annular wheel rim that is attached to and circumscribes a wheel hub. The wheel hub defines a primary cavity therein with a primary opening that at least partially faces the driver's seat. The wheel rim defines a secondary cavity therein with a secondary opening that also at least partially faces the driver's seat.

A primary inflatable cushion is attached to the steering wheel assembly, and operable to transition through the primary opening in the wheel hub from a non-expanded state, in which the primary cushion is stowed inside the primary cavity, to an expanded state, in which the primary cushion is inflated substantially outside the primary cavity. A primary inflator is in fluid communication with the primary inflatable cushion, and operates to selectively dispense inflation fluid thereto and thereby transition the primary inflatable cushion from the non-expanded state to the expanded state. A secondary inflatable cushion is also attached to the steering wheel assembly, and operable to transition through the secondary opening in the wheel rim from a non-expanded state, in which the secondary cushion is stowed inside the secondary cavity, to an expanded state, in which the secondary cushion is inflated substantially outside the secondary cavity. A secondary inflator is in fluid communication with the secondary inflatable cushion, and operates to selectively dispense inflation fluid thereto and thereby transition the secondary inflatable cushion from the non-expanded state to the expanded state. A controller is in operative communication with the primary and secondary inflators. The controller is operable to regulate the selective transition of the primary and secondary inflatable cushions from their respective non-expanded states to expanded states.

The above features and advantages, and other features and advantages of the present invention, will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
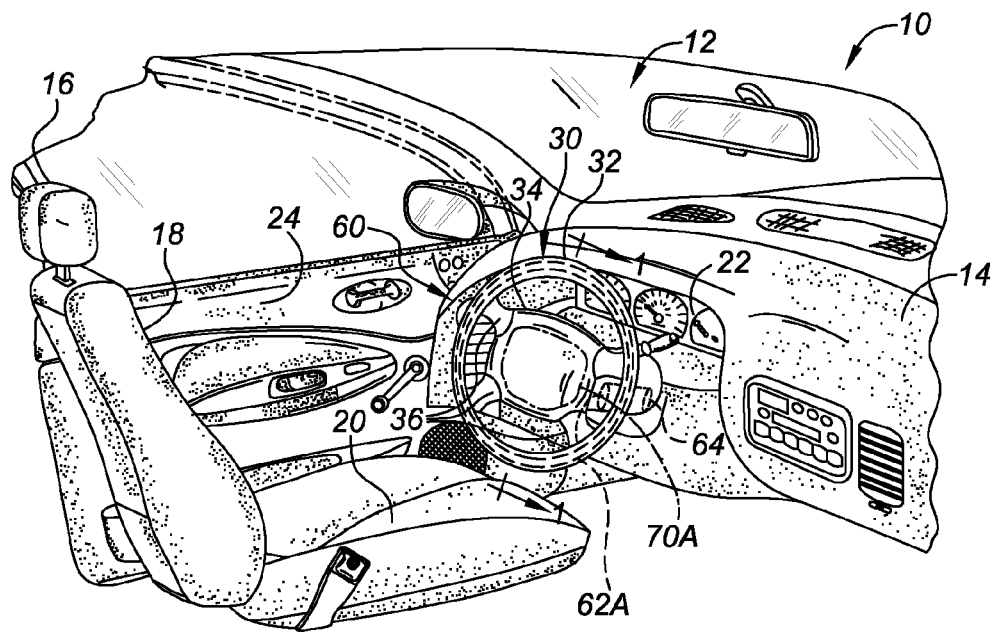
FIG. 1 is a perspective-view illustration of the passenger compartment of a representative motorized vehicle with a driver-side supplemental inflatable restraint system in accordance with the present invention operatively mounted therein.

Referring to the drawings, wherein like reference numbers refer to like components throughout the several views, FIG. 1 is a perspective-view illustration of the forward portion of a passenger compartment in a representative motorized vehicle with which the present invention may be incorporated and utilized. It should be readily understood that FIG. 1 is merely an exemplary application by which the present invention may be practiced. As such, the present invention is by no means limited to the particular structure or arrangement presented in FIG. 1. By way of example, and not limitation, the supplemental inflatable restraint systems of the present invention can be incorporated into any motorized vehicle, such as coupe- or sedan-type passenger cars, light trucks, sport utility vehicles, heavy duty vehicles, vans, buses, airplanes, trains, etc. In addition, the drawings presented herein are not to scale, and are provided purely for instructional purposes. Thus, the individual and relative dimensions shown in the drawings are not to be considered limiting. Finally, it should be readily appreciated that the adjectives used to specify spatial relationships (e.g., forward, rearward, horizontal, vertical, rear, front) indicate spatial relationships as they exist when located in their intended orientation with respect to the automobile.

The motorized vehicle, which is designated generally at 10 in FIG. 1, includes various interior compartments, represented herein by passenger compartment 12. An instrument panel 14 (also known as a "dashboard" or "fascia") and one or more vehicle seat assemblies, such as driver's seat 16, are mounted inside of the passenger compartment 12. Each seat assembly 16 can be of any suitable or conventional construction, but generally includes an adjustable backrest portion 18 and lower cushion portion 20. The vehicle 10 also includes a number of door assemblies 24 (only one of which is visible in FIG. 1) that are pivotably attached to the vehicle body, e.g., via vertical hinges or by a mechanical or automated track-and-sled mechanism (not depicted herein), to allow for occupant entry and egress.

The instrument panel 14 is configured to house various switches, accessories, and instrumentation, including, for example at the driver side, an electronic instrument cluster 22 with various digital or analog gauges—e.g., speedometer, odometer, and tachometer, or, at the front passenger side, heating, ventilation, and air conditioning (HVAC) vents and a glove compartment (not visible in the drawings). The instrument panel 14 is also designed to cover and conceal various underlying components when installed in the motorized vehicle 10. For instance, the instrument panel 14 overlies a plurality of HVAC ducts and assorted wiring harnesses (not shown), and preferably a passenger-side airbag device (also not shown).

A steering wheel assembly 30 is mounted to the vehicle 10, inside of the passenger compartment 12, located forward of and proximate to the driver's seat 16. The steering wheel assembly 30 includes an annular wheel rim 32, which is shown in FIG. 1 with a circular geometry (although other shapes, such as a butterfly design, may be used within the scope of the present invention). The wheel rim 32 is attached to a wheel hub 34, for example, by an array of integrally formed and elongated spokes 36 which extend generally radially therebetween. The number, geometry, and orientation of the spokes 36 may be infinitely varied.

Figure 2:
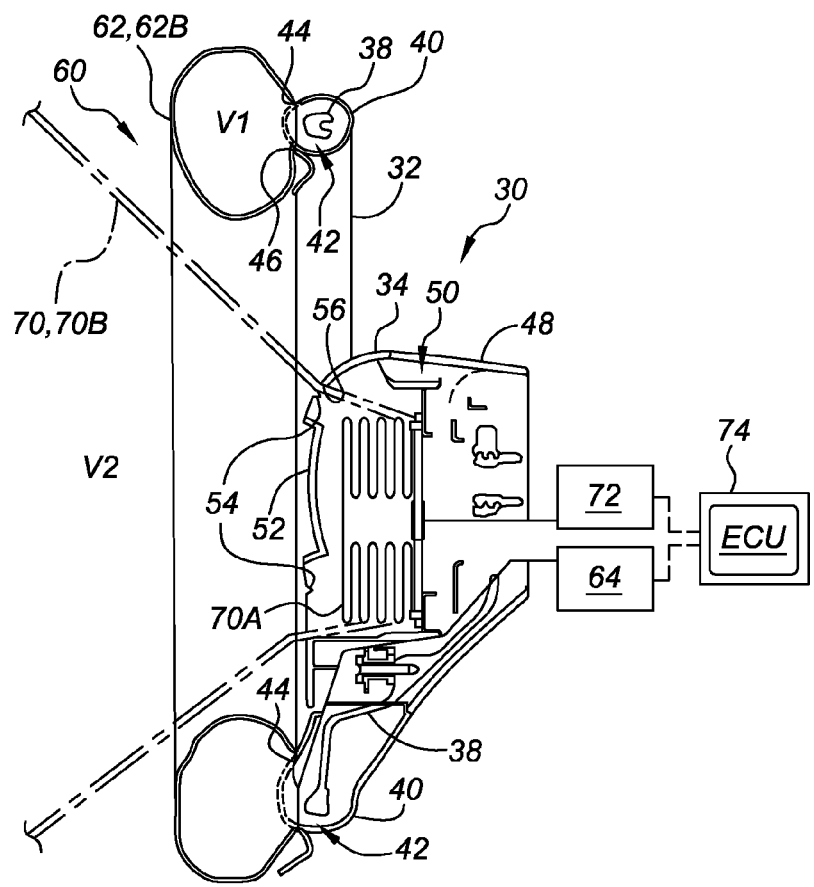
FIG. 2 is a schematic cross-sectional illustration of the supplemental inflatable restraint system from FIG. 1 taken along line 1-1.

With reference to both FIGS. 1 and 2, the wheel rim 32 is shown circumscribing the hub 34, but may be axially offset therefrom without departing from the intended scope of the present invention. The wheel rim 32 includes a rigid annular substrate 38 which is encased by and attached to an aesthetically pleasing exterior trim layer 40, forming a cavity or hollow 42 therebetween (also referred to herein as "secondary cavity" or "rim cavity"). The wheel rim 32 includes a tear seam 44, which may constitute a reduced thickness portion formed through hot knifing, pressurized water jet, laser cutting, etc., that extends circumferentially around the wheel rim 32, either continuously or in segments, along an inner surface of the trim layer 40. As will be described in further detail hereinbelow, the tear seam 44 is configured to weaken the trim layer 40 at preselected locations, and rupture at a predetermined threshold force to create an opening 46 (also referred to herein as "secondary opening" or "rim opening") that at least partially faces the driver's seat 16, such that a secondary inflatable cushion 62 can selectively deploy therethrough.

In a similar respect, the steering wheel hub 34 includes a rigid base 48 that defines a hollow space or cavity 50 therein (also referred to herein as "primary cavity" or "hub opening"). Similar to the wheel rim 32, the wheel hub 34 includes a functional and decorative cover 52 that encloses the primary cavity 50. The cover 52 is manufactured with a tear seam or deployment door 54 which is configured to rupture or displace under a predetermined threshold force to create an opening 56 (also referred to herein as "primary opening" or "hub opening") that at least partially faces the driver's seat 16, such that a secondary inflatable cushion 62 can selectively deploy therethrough.

The steering wheel hub 34 is attached, for example by an internally threaded axial bore, to a steering column shaft (not perceptible in the views of the drawings) to provide the vehicle operator with steering control of the vehicle 10. Such steering control can be through direct mechanical interfaces (e.g., recirculating ball or rack and pinion steering systems), with or without the assistance of hydraulic power steering (HPS), or with the assistance of computer controlled electric motors (e.g., electric power assisted steering systems—EPAS). Besides controlling the maneuverability of vehicle 10, the steering wheel assembly 30 preferably includes a button or other operator interface to activate a car horn device, and may integrate other controls, such as cruise control, cluster display controls, and audio system controls, that are built into the steering wheel rim 32 or hub 34.

In accordance with the present invention, the steering wheel assembly 30 is equipped with a driver-side supplemental inflatable restraint system, indicated generally in FIGS. 1 and 2 by reference numeral 60. The restraint system 60 includes a secondary inflatable cushion or flexible membrane 62 that deploys from the wheel rim 32. According to the preferred embodiment of the present invention, the secondary inflatable cushion 62 is in fluid communication with an inflation fluid dispensing apparatus or inflator 64, which is illustrated in FIG. 1 in an exemplary embodiment as a solid propellant canister attached to the underside of the steering wheel assembly 30 (but may be located anywhere throughout the vehicle 10). The inflation fluid dispensing apparatus 64 (also referred to herein as "secondary inflator") acts as a pyrotechnic pressure vessel, used to store and discharge inflation gas. That is, the inflation fluid dispensing apparatus 64 is selectively actuable to provide a fluid, preferably in the nature of a pressurized gas such as nitrogen, argon, or carbon dioxide, for deploying the secondary cushion 62 outward into the passenger compartment 12 (FIG. 1). By way of example, the rigid substrate 38 may be hollow in nature along the rim circumference, and fluidly coupled to the secondary inflator 64 to allow inflation fluid to travel through the hollow cavity, and exiting through a number of ports (not shown) facing the occupant side of the steering wheel assembly 30. The secondary cushion 62 could be fixed to the opposite side of the rigid substrate 38, and encompass the substrate 38 so that the ports are within the volume of the secondary cushion 62. Alternatively, a separate module may be attached to the substrate 38, inside of the exterior trim layer 40.

As seen in the drawings, the inflatable cushion 62 is shown in a first, non-expanded deflated state, represented schematically in FIG. 1 by hidden lines 62A, wherein the secondary inflatable cushion 62 is stowed inside the cavity 42, between the rigid annular substrate 38 and trim layer 40, in a folded and deflated condition. Upon actuation of the secondary inflator 64, the secondary inflatable cushion 62 transitions through the opening 46 in the wheel rim 32 to a second, expanded state 62B, FIG. 2, in which the inflatable cushion 62 is substantially outside the cavity 42 in an inflated condition.

The secondary inflatable cushion 62 is an annular, preferably unitary membrane made of a strong, lightweight, thin, flexible fabric of low permeability which may comprise a coated or uncoated woven cloth, multifilament yarn, nylon fabric, etc. Ideally, the secondary inflatable cushion 62 extends in a continuous and uninterrupted manner around the circumference of the wheel hub 34, protruding outward from a rearward facing surface thereof. Alternatively, the secondary inflatable cushion 62 may comprise an array of individual inflatable membranes that are oriented and designed to inflate from preselected locations of the wheel rim 34. In addition, the secondary cushion 62 is preferably fabricated without a venting feature that is designed to exhaust inflation gas therefrom. In so doing, the secondary restraint 62 will maintain its inflated pressure for longer periods of time than conventional airbag devices.

The driver-side supplemental inflatable restraint system 60 also includes a primary inflatable cushion or flexible membrane 70 that deploys from the wheel hub 34. More particularly, the primary inflatable cushion 70 is in fluid communication with an inflation fluid dispensing apparatus or inflator 72 that, similar to the secondary inflator 64 shown in FIG. 1, is preferably a solid propellant canister housed within the steering wheel assembly 30 (but may be located at alternate locations throughout the vehicle 10). The inflation fluid dispensing apparatus 72 (also referred to herein as "primary inflator") acts as a pyrotechnic pressure vessel, selectively actuable to provide a fluid for deploying the primary inflatable cushion 70 outward into the passenger compartment 12 (FIG. 1). For example, the primary inflatable cushion 70 is shown in FIG. 2 in a first, non-expanded deflated state, identified by reference numeral 70A, wherein the primary inflatable cushion 70 is stowed inside the hub cavity 50. Upon activation of the primary inflator 72, the primary inflatable cushion 70 transitions through the opening 56 in the wheel hub 34 to a second, expanded state (represented schematically in FIG. 2 by phantom lines 70B), in which the inflatable cushion 62 is substantially outside the cavity 50 in an inflated condition. Notably, the primary and secondary inflators 64, 72 can be replaced by a single inflator without departing from the scope and spirit of the present invention.

A controller 74, which is schematically depicted in FIG. 2 in a representative embodiment as a microprocessor-based electronic control unit (ECU) of conventional architecture, is in operative communication with the primary and secondary inflators 72, 64, and programmed and configured, at least in part, to control the individual and cooperative operation thereof. Specifically, the controller 74 is operable to regulate the activation of the inflators 64, 72 and, thus, the selective transition of the primary and secondary inflatable cushions 70, 62 from their respective non-expanded states 70A, 62A to expanded states 70B, 62B. The controller 74 is programmed and configured to inflate the cushions 62, 70 in response to a predetermined activation event. For example, a number of accelerometers (not shown) may be dispersed throughout the vehicle 10, and configured to transmit signals to the controller 74. The controller 74, in turn, will deliver an activation signal (e.g., electric charge) to each of the inflators 64, 72 in response to signals from the accelerometers indicating a sudden deceleration spike. The cushions 62, 70 may be inflated contemporaneously, or one at a time in any order. However, it is desirable that the controller 74 inflate the secondary cushion 62 prior to the primary cushion 70 to eliminate any inadvertent contact between a vehicle occupant and the steering wheel rim 32, whether belted or unbelted. Those skilled in the art will recognize and understand that the means of communication utilized by the controller 74 is not restricted to the use of electric cables ("by wire"), but may be, for example, by radio frequency and other wireless technology, fiber optic cabling, etc.

In accordance with preferred practice of the present invention, the secondary inflatable cushion 62 preferably has an inflated volume V1 that is smaller than the inflated volume V2 of the primary inflatable cushion 70. In a similar respect, it is also desired that the secondary inflatable cushion 62 have an inflation pressure that is greater than the inflation pressure of the primary inflatable cushion 70. Finally, the density of the secondary inflatable cushion 62 is preferably greater than the density of the primary inflatable cushion 70.

While the best modes for carrying out the present invention have been described in detail herein, those familiar with the art to which this invention pertains will recognize various alternative designs and embodiments for practicing the invention within the scope of the appended claims.

The invention claimed is:

1. A supplemental inflatable restraint system for a vehicle having a passenger compartment with a seat assembly mounted therein, the restraint system comprising:
   a steering wheel assembly configured to operatively attach to the vehicle inside of the passenger compartment proximate to the seat assembly, said steering wheel assembly including a wheel rim defining a first cavity with a first opening;
   a first inflatable cushion operable to transition through said first opening from a non-expanded state in which said first inflatable cushion is substantially inside said first cavity to an expanded state in which said first inflatable cushion is substantially outside said first cavity;
   at least one fluid dispensing apparatus in fluid communication with said first inflatable cushion and operable to selectively dispense inflation fluid thereto and thereby transition said first cushion from said non-expanded state to said expanded state; and
   wherein said first inflatable cushion is located substantially closer to the seat assembly when in said expanded state than when in said non-expanded state.

2. The restraint system of claim 1, wherein said steering wheel assembly further includes a wheel hub operatively attached to said wheel rim and defining a second cavity with a second opening, the restraint system further comprising:
   a second inflatable cushion in fluid communication with said at least one fluid dispensing apparatus and operable to transition through said second opening from a non-expanded state in which said second inflatable cushion is substantially inside said second cavity to an expanded state in which said second inflatable cushion is substantially outside said second cavity.

3. The restraint system of claim 2, wherein said first inflatable cushion has a first inflated volume and said second inflatable cushion has a second inflated volume that is larger than said first inflated volume.

4. The restraint system of claim 2, wherein said first inflatable cushion has a first inflation pressure and said second inflatable cushion has a second inflation pressure that is less than said first inflation pressure.

5. The restraint system of claim 2, wherein said first inflatable cushion has a first density and said second inflatable cushion has a second density that is less than said first density.

6. The restraint system of claim 2, wherein said at least one fluid dispensing apparatus includes a first inflator in fluid communication with said first inflatable cushion and a second inflator in fluid communication with said second inflatable cushion.

7. The restraint system of claim 2, further comprising:
   a controller in operative communication with said at least one fluid dispensing apparatus and operable to regulate said selective transition of said first and second inflatable cushions from respective ones of said non-expanded states to said expanded states.

8. The restraint system of claim 7, wherein said controller is programmed and configured to transition said first and second inflatable cushions to respective ones of said expanded states in response to a predetermined activation event, said first inflatable cushion being transitioned prior to said second inflatable cushion.

9. The restraint system of claim 1, wherein said first inflatable cushion extends continuously around a circumference of said wheel hub.

10. The restraint system of claim 1, wherein said first inflatable cushion is characterized by a lack of a venting feature configured to exhaust inflation gas therefrom.

11. The restraint system of claim 1, wherein said wheel rim includes an annular substrate with an exterior trim layer operatively attached thereto, said wheel rim including a tear seam configured to weaken said trim layer at preselected locations such that said first inflatable cushion can selectively deploy therethrough.

12. A driver-side supplemental inflatable restraint system for a motorized vehicle having a passenger compartment with a driver's seat mounted therein, the restraint system comprising:
   a steering wheel assembly configured to operatively mount to the vehicle inside of the passenger compartment forward of and proximate to the driver's seat, said steering wheel assembly including an annular wheel rim circumscribing and operatively attached to a wheel hub, said wheel hub defining a primary cavity therein with a primary opening at least partially facing the driver's seat, and said wheel rim defining a secondary cavity therein with a secondary opening at least partially facing the driver's seat;

a primary inflatable cushion operable to transition through said primary opening from a non-expanded state in which said primary cushion is stowed inside said primary cavity to an expanded state in which said primary cushion is inflated substantially outside said primary cavity;

a secondary inflatable cushion operable to transition through said secondary opening from a non-expanded state in which said secondary cushion is stowed inside said secondary cavity to an expanded state in which said secondary cushion is inflated substantially outside said secondary cavity; and at least one fluid dispensing apparatus in fluid communication with said primary and secondary inflatable cushions and operable to selectively dispense inflation fluid thereto and thereby transition said primary and secondary inflatable cushions from respective ones of said non-expanded states to said expanded states.

13. The restraint system of claim 12, wherein said primary inflatable cushion has a first inflated volume and said secondary inflatable cushion has a second inflated volume that is substantially smaller than said first inflated volume.

14. The restraint system of claim 12, wherein said primary inflatable cushion has a first inflation pressure and said secondary inflatable cushion has a second inflation pressure that is greater than said first inflation pressure.

15. The restraint system of claim 12, wherein said primary inflatable cushion has a first density and said secondary inflatable cushion has a second density that is greater than said first density.

16. The restraint system of claim 12, wherein said at least one fluid dispensing apparatus includes a primary inflator in fluid communication with said primary cushion and a secondary inflator in fluid communication with said secondary cushion.

17. The restraint system of claim 16, further comprising:
a controller in operative communication with said primary and secondary inflators and operable to regulate said selective transition of said primary and secondary inflatable cushions from respective said non-expanded states to said expanded states.

18. The restraint system of claim 17, wherein said controller is programmed and configured to transition said primary and secondary inflatable cushions to respective said expanded states in response to a predetermined activation event, said secondary inflatable cushion being transitioned prior to said primary inflatable cushion.

19. The restraint system of claim 12, wherein said secondary inflatable cushion is characterized by a lack of a venting feature configured to exhaust inflation gas therefrom.

20. A motorized vehicle having a passenger compartment, comprising:

at least one seat assembly mounted inside the passenger compartment, said at least one seat assembly including a driver's seat operatively mounted at a forward end of the passenger compartment;

a steering wheel assembly operatively mounted to the vehicle inside of the passenger compartment forward of and proximate to the driver's seat, said steering wheel assembly including an annular wheel rim circumscribing and operatively attached to a wheel hub, said wheel hub defining a primary cavity therein with a primary opening at least partially facing the driver's seat, and said wheel rim defining a secondary cavity therein with a secondary opening at least partially facing the driver's seat;

a primary inflatable cushion operable to transition through said primary opening from a non-expanded state in which said primary cushion is stowed inside said primary cavity to an expanded state in which said primary cushion is inflated substantially outside said primary cavity;

a primary inflator in fluid communication with said primary inflatable cushion and operable to selectively dispense inflation fluid thereto and thereby transition said primary inflatable cushion from said non-expanded state to said expanded state;

a secondary inflatable cushion operable to transition through said secondary opening from a non-expanded state in which said secondary cushion is stowed inside said secondary cavity to an expanded state in which said secondary cushion is inflated substantially outside said secondary cavity;

a secondary inflator in fluid communication with said secondary inflatable cushion and operable to selectively dispense inflation fluid thereto and thereby transition said secondary inflatable cushion from said non-expanded state to said expanded state; and a controller in operative communication with said primary and secondary inflators and operable to regulate said selective transition of said primary and secondary inflatable cushions from respective ones of said non-expanded states to said expanded states.

* * * * *